United States Patent [19]

Eichweber

[11] Patent Number: 4,814,628

[45] Date of Patent: Mar. 21, 1989

[54] ARRANGEMENT FOR THE TRANSMISSION OF LASER LIGHT WITH REFERENCE SOURCE FOR BACKSCATTER OBSTRUCTION DETECTION

[75] Inventor: Kurt Eichweber, Hamburg, Fed. Rep. of Germany

[73] Assignee: Precitronic Gesellschaft fuer Feinmechanik und Electronic mbH, Hamburg, Fed. Rep. of Germany

[21] Appl. No.: 98,106

[22] Filed: Sep. 17, 1987

[30] Foreign Application Priority Data

Mar. 20, 1987 [DE]  Fed. Rep. of Germany ....... 3709142

[51] Int. Cl.$^4$ ............................................. G01N 15/06
[52] U.S. Cl. .................................... 250/574; 250/575; 250/221; 356/442
[58] Field of Search ................ 250/216, 574, 575, 239, 250/221, 222, 551; 356/229, 230, 231, 232, 448, 442; 455/617, 609, 611

[56] References Cited

U.S. PATENT DOCUMENTS

| 3,510,666 | 5/1970 | Topol | 250/574 |
| 3,872,315 | 3/1975 | Boll | 250/575 |
| 3,901,812 | 8/1975 | Hallengren | 250/575 |
| 4,547,675 | 10/1985 | Muggli et al. | 250/575 |

Primary Examiner—David C. Nelms
Attorney, Agent, or Firm—Townsend & Townsend

[57] ABSTRACT

The arrangement for the transmission of laser light (9) exhibits a laser emitter (1) and a receiver (2) for the laser light (9). In order that it should be possible to establish if the optical system (6) of the receiver (2) becomes dirty or an obstruction passes in front of this optical system, the laser receiver (2) is provided with a reference light source (12) disposed after the optical system (6). If the objective (6) becomes dirty or if an obstruction passes in front of the same, light from the reference light source (12) is scattered into the detector (7), so that an alarm indication can be given by a warning circuit (14).

14 Claims, 1 Drawing Sheet

ARRANGEMENT FOR THE TRANSMISSION OF LASER LIGHT WITH REFERENCE SOURCE FOR BACKSCATTER OBSTRUCTION DETECTION

The invention relates to an arrangement for the transmission of laser light, having a laser emitter and a receiver for the laser light.

Arrangements of this type are required for many purposes. On the one hand, they can serve for measuring. For this purpose, the laser emitter and receiver can exhibit, for example, a distance from one another, the transit time of laser light pulses or alternatively the direction of the laser light then being determined. On the other hand, for other measuring purposes the laser emitter and laser receiver can be disposed close beside one another, the light reflected by a retroreflector, which is disposed at a certain distance, then being measured.

Such arrangements are also suitable for the transmission of information, in that the laser light is modulated in a manner corresponding to the information to be transmitted, for example amplitude-modulated or pulse-modulated.

With all these modes of transmission of laser light, there is the danger that the beam path can be intentionally or unintentionally interrupted. Thus, on the one hand, the windows of the laser receiver, through which the laser light is to pass, can be soiled by dust or other dirt originating from the environment. The same applies to lens systems which are disposed in front of the laser receiver, in order to concentrate the laser light. Finally, it would also be possible for an object not transmitting the laser radiation to be brought intentionally in front of the laser receiver, with malicious intent. Such an obstruction could also pass unintentionally in front of the light exit aperture of the laser emitter or the light entrance aperture of the receiver.

In all these cases, the transmission of the laser light, and thus the measuring process or the information transmission, is obstructed or even made impossible.

The object of the invention consists in providing a device with which the aforementioned disturbances in the transmission path can be detected and reported.

The solution according to the invention consists in that the receiver exhibits, after its optical elements, a reference light source, the scattered light of which is detectable by the detector.

In an area free from disturbance, no light from the reference light source passes into the detector, or alternatively an accurately determined component of this light of the reference light source, which component can be subtracted, as an invariably constant background, in the course of the evaluation. This background can also be made very small, by screening off the direct light path from the reference light source to the detector. In this case, the light of the reference light source radiates principally away from the detector.

However, if the objective now becomes dirty, the light which has passed through the objective and which originates from the reference light source is backscattered at the dirt, and thus passes into the detector. This scattered light intensity is an indication of the occurrence of dirt formation, so that an alarm can be given, in order to eliminate the dirt formation.

The same procedure takes place if an obstruction appears, intentionally or unintentionally, in front of the objective. In this case, the light which has passed through the objective and which originates from the reference light source is scattered at this obstruction and thrown back, and passes back through the objective into the detector, so that an alarm can be triggered.

It is known to employ retroreflectors for the transmission of laser beams. However, such a retroreflector can, in addition to the function of reflection, also exhibit a detector for the laser radiation. Particularly advantageous in this instance are triple mirrors, which are ground away at their rear corner, so that the detector for laser light can be disposed here. If a reference light source is also disposed here, then, in a manner similar to that which has just been described, the occurrence of dirt formations or obstructions can be detected. In this case, the forwardly directed light of the reference light source is, in fact, scattered by the dirt formations or by the obstruction in a rearward direction into the detector and thrown back, where this occurring light intensity is then the course for the emission of an alarm indication.

The reference light source normally needs to irradiate only a relatively small light intensity; in this case, an LED diode is particularly suitable as reference light source.

In order that the light of the reference light source should not disturb the transmission of the laser light, it is expediently provided that the reference light source is driveable by a frequency or pulse sequence not obstructing a signal transmission of the laser light. In place of this, or in addition thereto, it is possible to provide that the wavelength of the reference light source is different from that of the laser. By means of such measures, it is possible in a very effective manner to separate the total signal of the detector into two signals, namely a component originating from the laser beam and a component which originates from the reference light source and which indicates the presence of a disturbance.

The warning indications can be given by appropriate warning systems, and can comprise acoustic and/or optical alarm indications.

The invention is described hereinbelow with the aid of an advantageous embodiment, with reference to the accompanying drawings. In the drawings:

FIG. 1 shows a laser emitter 1 and a receiver 2 for the laser light, which are disposed at a distance from one another.

Figure 1:
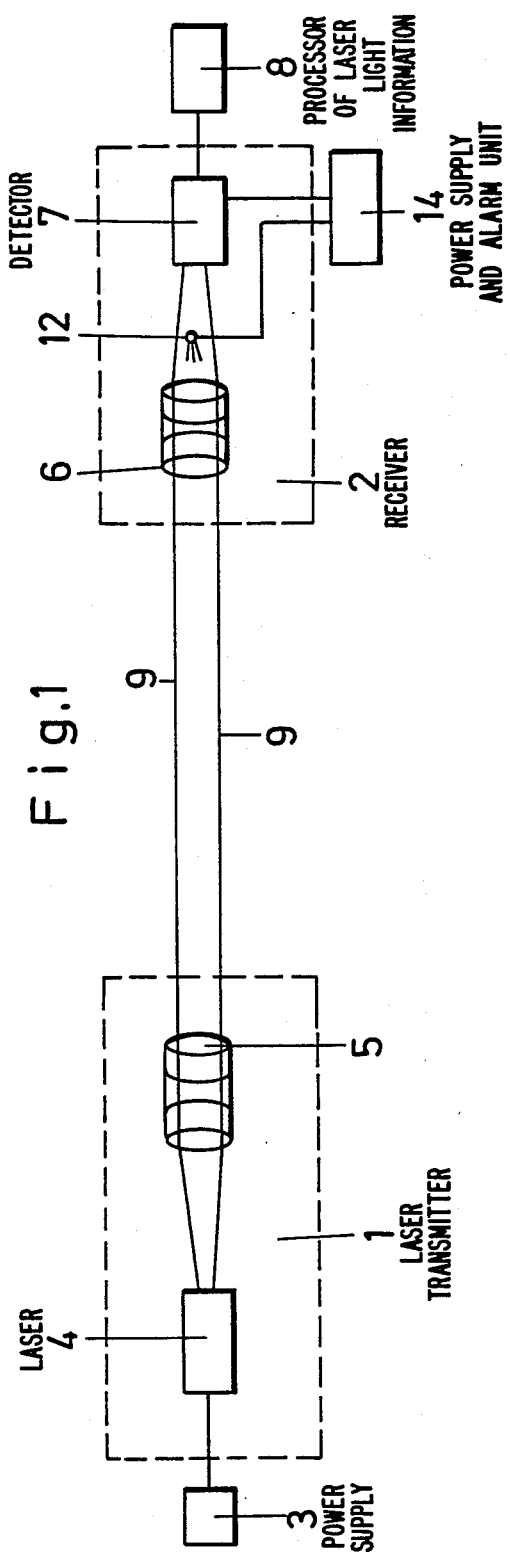
FIG. 1 shows: a block diagram of the arrangement according to the invention.

The laser emitter 1 exhibits a current supply unit for a laser 4. In this case, if transit times are to be measured or information is to be transmitted, the current supply unit 3 can also be provided with appropriate pulse modulation devices or other modulation devices, so that the light of the laser 4 can be appropriately modulated. The light of the laser 4 is concentrated by an optical system 5.

The receiver 2 exhibits a receiving optical system 6, by which the laser light is concentrated onto a receiver or detector 7 for the laser light. In a unit 8, it is then possible for the appearance of the laser light to be indicated, for the transit time to be determined, or for the information transmitted by modulation to be regained.

In this case, the path of the laser light is schematically shown in FIG. 1 by the rays 9.

In the receiver 2 there is provided, after the objective 6, a reference light source 12, the light of which is then scattered into the detector 7 if the objective becomes dirty or if an obstruction is situated in front of the objective 6. 14 designates a circuit which supplies the reference light source 12 with energy and which emits a warning if scattered light is detected by the detector 7. In this case, the detection level can be influenced by election of an appropriate threshold value.

Figure 2:
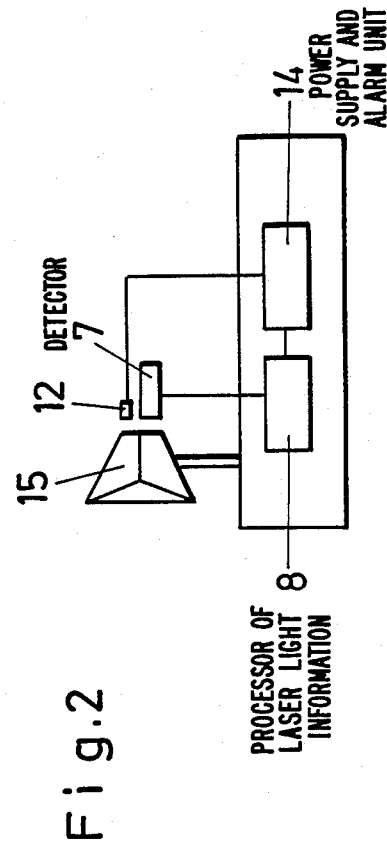
FIG. 2 shows: a retroreflector which can be used in conjunction with the invention.

FIG. 2 shows a retroreflector 15 for the laser light, the rear corner of which retroreflector has been removed, so that the laser light coming from the left can strike a detector 7 here. This retroreflector not only acts as a retroreflector in the form of a triple mirror, but can also at the same time detect laser radiation.

In a similar way to that applicable in the case of the embodiment of FIG. 1, beside the detector 7 there is provided a reference light source 12, which is connected to a supply and alarm circuit 14. If the triple mirror 15 becomes dirty, then light from the reference light source 12 is scattered into the detector, so that a warning indication can be emitted by the circuit 14. On the other hand, if a obstruction passes in front of the retroreflector 15, then a ccomponent of the light of the reference light source 12 is likewise scattered by this obstruction into the detector 7, so that an alarm indication can likewise be given.

I claim:

1. A system for detecting an obstruction in an optical path between a transmitter of laser light in a first unit and a receiver of laser light in a second unit, the receiver having a receiving lens through which transmitted laser light is intended to pass and a receiving detector normally in optical contact with and responsive to the transmitted laser light passing through the receiving lens, comprising:
    a reference light source, situated along the optical path upstream of the receiving detector, adapted to provide a reference light output directed along the optical path toward the transmitter;
    the receiving detector being responsive to scattered light from said reference light source; and
    means for warning when scattered reference light is detected by the receiving detector so that an obstruction in the optical path causes a portion of the reference light to become scattered and reflected back toward the receiving detector, whereby the detection of scattered reference light by the receiving detector indicates an obstruction in the optical path.

2. A system according to claim 1, wherein said reference light source is situated in the second unit between the receiving lens and the receiving detector.

3. A system according to claim 1, wherein said reference light source in a light emitting diode.

4. A system according to claim 1, wherein said reference light source outputs light whose frequency is different than a frequency of light transmitted by the laser transmitter.

5. A system according to claim 1, wherein said reference light source outputs light in a pulse sequence different than a pulse sequence of light transmitted by the laser transmitter.

6. A system according to claim 1, wherein said means for warning provides an audible warning.

7. A system according to claim 1, wherein said means for warning provides a visual warning.

8. A system for detecting an obstruction in an optical path between a transmitter of laser light in a first unit and a receiver of laser light in a second unit having a receiving lens through which transmitted laser light is intended to pass, comprising:
    a receiving retroreflector, situated to receive transmitted laser light passing through the receiving lens, said receiving retroreflector having a corner remote from the receiving lens ground away to form a plane;
    a reference light source, situated to provide a reference light output directed toward the plane formed on the receiving retroreflector;
    a receiving detector, normally in optical contact with said responsive to the transmitted laser light passing through the receiving lens and also responsive to scattered light from said reference light source, situated to face the plane formed on the receiving retroreflector; and
    means for warning when scattered reference light is detected by the receiving detector so that an obstruction in the optical path cause a portion of the reference light to become scattered and reflected back toward the receiving detector, whereby the detection of scattered reference light by the receiving detector indicating an obstruction in the optical path.

9. A system according to claim 8, wherein said receiving retroreflector is situated in the second unit.

10. A system according to claim 8, wherein said reference light source in a light emitting diode.

11. A system according to claim 8, wherein said reference light source outputs light whose frequency is different than a frequency of light transmitted by the laser transmitter.

12. A system according to claim 8, wherein said reference light source outputs light in a pulse sequence different than a pulse sequence of light transmitted by the laser transmitter.

13. A system according to claim 8, wherein said means for warning provides an audible warning.

14. A system according to claim 8, wherein said means for warning provides a visual warning.

* * * * *